(No Model.) 6 Sheets—Sheet 1.

J. F. McLAUGHLIN.
ELECTRICAL TYPE WRITER.

No. 367,650. Patented Aug. 2, 1887.

(No Model.)  
6 Sheets—Sheet 3.

J. F. McLAUGHLIN.
ELECTRICAL TYPE WRITER.

No. 367,650. Patented Aug. 2, 1887.

Witnesses,  
Percy C. Bowen  
Harry S. Rohrer

Inventor,  
James F. McLaughlin;  
By F. R. Harding  
his Attorney.

N. PETERS, Photo-Lithographer, Washington, D. C.

(No Model.) 6 Sheets—Sheet 4.

J. F. McLAUGHLIN.
ELECTRICAL TYPE WRITER.

No. 367,650. Patented Aug. 2, 1887.

Witnesses,
Percy C. Bowen
Harry S. Rohrer

Inventor,
James F. McLaughlin
By J. R. Harding
his Attorney.

UNITED STATES PATENT OFFICE.

JAMES F. McLAUGHLIN, OF PHILADELPHIA, PENNSYLVANIA.

ELECTRICAL TYPE-WRITER.

SPECIFICATION forming part of Letters Patent No. 367,650, dated August 2, 1887.

Application filed November 23, 1886. Serial No. 219,616. (No model.)

*To all whom it may concern:*

Be it known that I, JAMES F. McLAUGHLIN, a citizen of the United States, residing at Philadelphia, in the county of Philadelphia and State of Pennsylvania, have invented certain new and useful Improvements in Receivers for Electrical Type-Writers; and I do hereby declare the following to be a full, clear, and exact description of the invention, such as will enable others skilled in the art to which it appertains to make and use the same.

My invention relates to an electrical typewriter capable of being used either as an independent local electro-mechanical instrument or as a receiver, in conjunction with a suitable transmitter for printing-telegraphs. In this latter instance the instrument shown in the accompanying drawings, and described hereinafter, is more particularly designed to be utilized in conjunction with my improved transmitter now pending in the United States Patent Office, filed November 12, 1886, Serial No. 218,339.

As an independent electro-mechanical typewriter it consists, essentially, of a mechanically-arranged key-board carrying the ordinary letters, characters, and punctuation-marks necessary for use in machines of this description. The depression of any key thereof will mechanically cause the corresponding type-lever to make the impression on the paper which is fed and carried by the paper-roll, and the release of said key will allow its respective typelever to fall, and at a determined time or instant thereafter (when said lever reaches its normal inactive position) it will automatically close an electrical circuit and thereby operate the mechanism shown and described for making the desired distance or space between the letters or characters imprinted upon the paper roll. In order to make the necessary spaces between words, as in ordinary typewriters, a specially-designed spacing-key located on the key-board can be depressed the requisite number of times needed to make the desired distance or spaces between words, letters, or characters.

When, as before stated, my instrument is used in conjunction with a transmitter such as shown and described in the before-mentioned pending application, or with any other such analogous instrument, the mechanical key-board is dispensed with and the circuit-closing key-board of such transmitting-instrument is substituted therefor, each key of which is so arranged that its depression will cause a corresponding type-lever of the receiver to register or imprint upon the paper roll both of the local-receiver and the receiver or receivers at the extremity or extremities of the line or lines. When desirable or necessary to detach or cut out either the local receiving-instrument or the receiver at the end of the line, or both at the same time, certain means for accomplishing this result are provided, as will be more fully explained hereinafter.

The construction and arrangement of the particular parts of this invention are substantially the same when the instrument is used as a local type-writer as when electrically connected with a transmitter for printing-telegraphs, except that in the former instance the key-board is operated mechanically with respect to the type-levers and in the latter is electro-mechanical. The spacing-key, however, both as regards the mechanical key-board and transmitter, is electro-mechanical.

My invention consists, further, in certain details of construction, arrangements, and combinations of parts and electrical connections, which will be more fully hereinafter described, and the particular points of novelty in which will be specifically pointed out in the appended claims.

The means operated by the descent of the type-levers and the depression of the spacing-keys for making the desired distance between the letters and words, and the arrangement of the devices for automatically feeding the paper around the roll, and at the same time making the necessary space between lines, is more fully described hereinafter, but will not be claimed, as such mechanism forms the subject-matter of two applications now pending in the United States Patent Office, filed, respectively, October 27, 1886, and December 19, 1886, and bearing serial numbers, respectively, 217,338 and 221,239.

Referring to the accompanying drawings, Figure 1 is a diagrammatic view showing two receivers, respectively at each end of the line-circuit, each electrically connected with its local transmitter A' or A", which is of the construction described in the before-mentioned application, and provided each with a plug-switch for simultaneously or alternately cutting said receivers out of circuit with their respective transmitting-instruments A' or A", the receivers at each end of said line being in circuit with its respective transmitter, the metal plug of the switch removed, and the transmitting-instrument (lettered A') arranged to transmit each electric pulsation caused by the depression of any of its keys over the line to the distant transmitting-instrument A", which is, as shown, in proper position to synchronously indicate or signify by means of its trailing arm the letter depressed at the instrument A', and at the same time convey said pulsation to its receiver. Fig. 9ª is a detail view in elevation, showing the construction of the spring circuit-closer arranged on the end of the said traveling carriage.

Like letters of reference mark the same parts in all the figures of the drawings.

Before entering into a detailed description of the construction, arrangement, and combination of parts, it will be hereinafter understood that this invention will be first described as a receiver in circuit with its respective transmitting-instrument at each end of the line, each of said transmitting-instruments being of the improved construction described and claimed in my separate pending application therefor.

Figure 1:
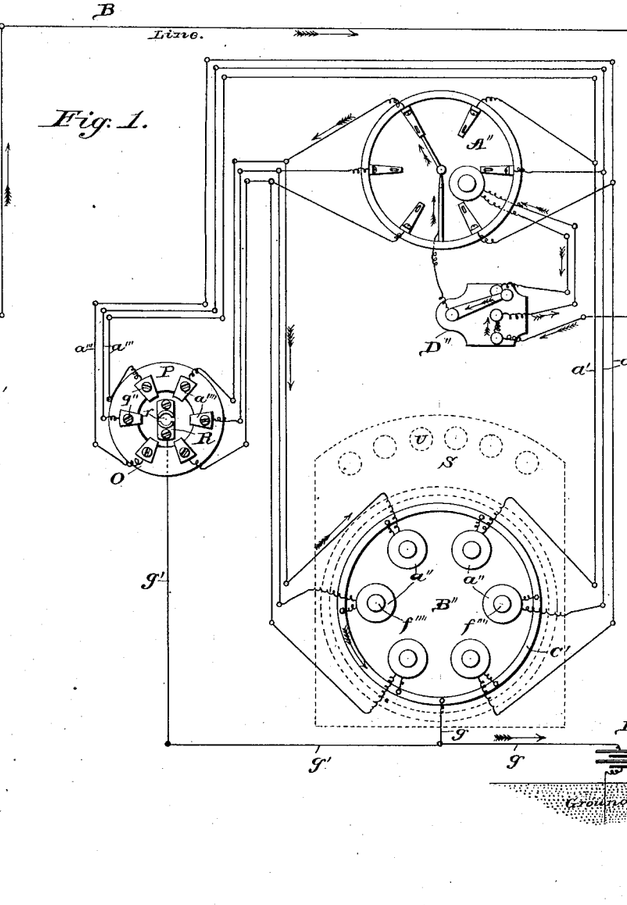
Figure 2:
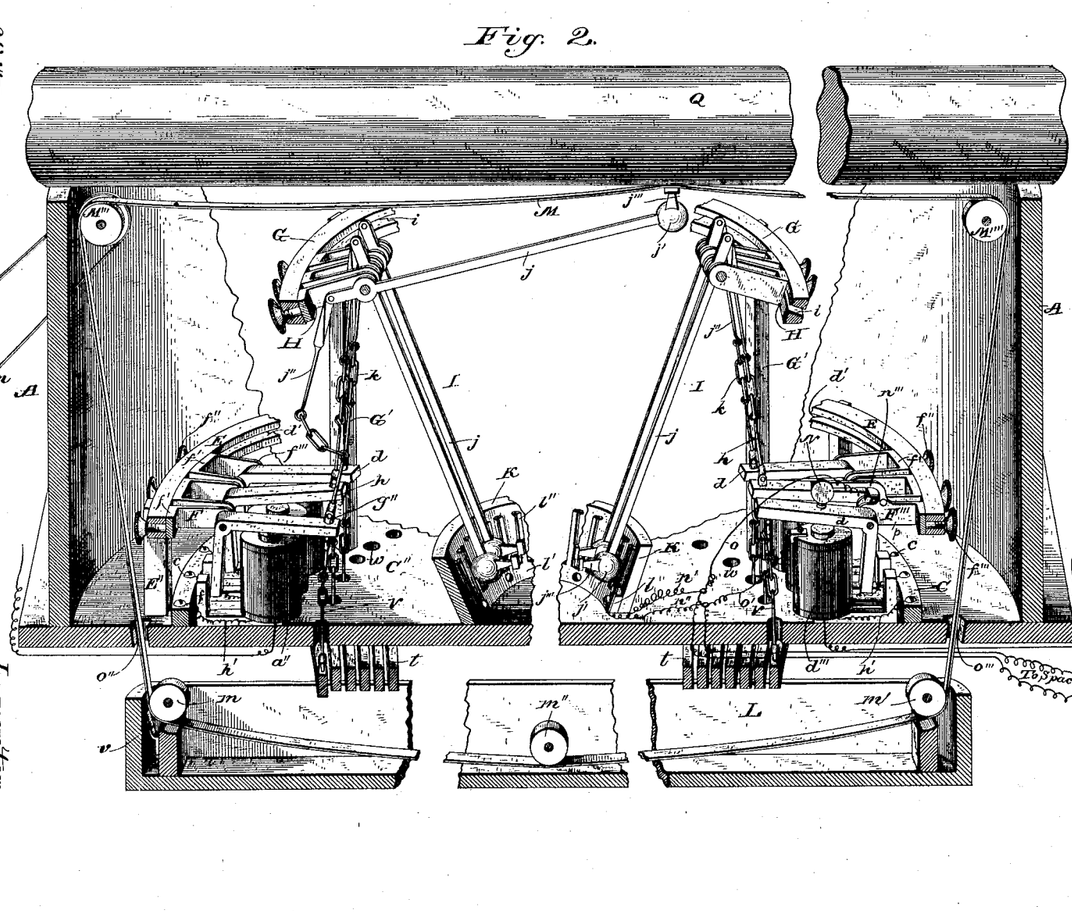
Fig. 2 is a detached view of my improved type-writer, with parts broken away, showing, partly in section and partly in perspective, the arrangement and construction of the component parts, hereinafter more fully described.
Figure 3:
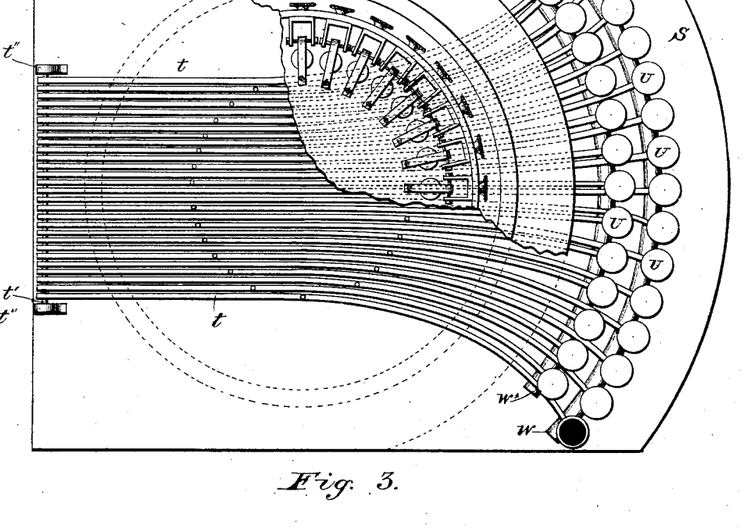
Fig. 3 is a top plan view, also with parts broken away, showing the arrangement and connection of the mechanical key-board with the type-levers.

A' and A" represent, respectively, two of my transmitting-instruments, located, as shown in Fig. 1 and as above explained, at each end of the line circuit B, having the button-switches D' and D" and their respective parts adjusted properly, in order to convey or transmit an electrical impulse caused by the depression of any of the circuit-closing keys from the receiver B' of instrument A' simultaneously over the line B, through the instrument A" into its respective receiver B", the transmitters being, as before stated, of the same construction as illustrated in my separate pending application therefor, and the respective adjustable parts thereof arranged relatively, in a similar manner to that shown in Figs. 2 and 3 of said pending application.

The electrical connections between each instrument A' or A" and its respective receiver are as follows:

$a'$ $a'$ indicate a series of wires connecting each retracting-spring of the transmitter to the corresponding electro-magnet $a''$ of the receiver B' or B", it being understood that when my invention is used in connection with a transmitting-instrument A' or A" of this particular construction each key has a corresponding electro-magnet and type-lever in said receiver.

$a'''$ $a'''$ designate the wires connecting the metallic segments $a''''$ of the plug-switch O O with the wires $a'$ leading from the instrument A' or A" to the receiver B' or B". The segments $a''''$ of the plug-switch correspond in number to the keys of the instrument A' or A", and the before-described wires $a'''$, connecting said segments with the wires $a'$, are joined or connected, as shown, in any suitable manner near the instrument A' or A".

D''' or D'''' represents a suitable constant battery connected to the metallic ring C or C' of the receiver B' or B".

$g'$ designates the wire connecting the battery D''' or D'''' with its respective plug-switch O.

C or C' indicates a metallic conducting-ring (shown in Figs. 1 and 2) secured upon the base C'' of the cylindrical inclosing-case A. This ring is provided on its edge or top with a series of binding-posts, c c c, located at regular intervals thereupon, being opposite and corresponding to the number of magnets $a''$.

The electro-magnets $a''$ $a''$, as before stated, correspond in number and relative situation to the keys of its respective instrument A' or A'', and are secured in circular order inside of and in proximity to the ring C or C' upon a suitable base of hard rubber or other insulating material (not shown) fastened to the bottom C'' of the casing A. Each of said magnets $a''$ is of the ordinary construction, except that the lower pole, $f$, thereof is converted and brought out and up parallel to the side of said magnet, forming, substantially, an elbow-shaped frame, as shown, the object of which will be hereinafter explained.

E designates a non-conducting slotted ring of greater diameter than the ring C or C', which is supported in an elevated position by the standards E'' E'' the requisite height from the base C'' to allow the pivoted armatures $d$ $d$ to be above yet in proximity to the magnets $a''$ $a''$. This ring E is provided with a central annular slot, $d'$, running circumferentially therearound, in which are secured the adjustable supporting-plates F F, having the armatures $d$ $d$ pivotally connected thereto in a manner to be hereinafter explained. The supports or adjustable bearing-plates F F consist each of a base-plate, $f'$, made, preferably, of some insulating material and formed curved or convex to conform with the curvature of the ring E, the adjusting-screw $f'''$, and the parallel supporting arms or lugs $f''$ $f'''$, between which latter is pivoted one of the rectangular elbow-shaped armatures $d$ $d$, having its forward end provided with two upright studs, $g''$ $g''$, to which are attached by a pintle one end of the link-rod $h$, the other depending arm of said armature projecting downwardly in the vicinity of the pole $f$ of its respective magnet $a''$.

$h'$ $h'$ are a series of wires connecting ring C or C' with each electro-magnet $a''$.

G' G' are the standards or uprights which support and secure the type-lever ring G the desired height above the base C'' of the casing. This ring is of less diameter than the ring C or C', previously described, and is provided with an annular transverse slot, $i$, running centrally and circumferentially around the periphery thereof, the object of such construction being to allow the type-lever supporting devices H H to be adjusted at regular degrees or intervals around the said ring and at a desired angle in the slot $i$. Each one of the type-lever supports H H is of the same construction as the plates F F, and serve, respectively, as pivotal supports for the fulcrumed weighted type levers I I, which carry each a letter, character, or punctuation-mark corresponding to one of the keys of the instrument A' or A''. The series of type-levers are, as before described, fulcrumed near their upper ends or extremities, by a suitable pivot-pin, between the projecting lugs of the support H, and are each formed of a straight rod, $j$, of a length equal to the radius of the ring G.

Upon the lower forward end of each rod $j$ is secured a metallic ball or weight, $j'$, into which is respectively placed one of the insertible types $j'''$, as shown, and at the upper end of said rod is fastened the end of the link rod $j''$, the lower extremity of which is attached to the flexible link-connection $k$, which connection has its other end secured to the free end of the link-rod $h$, hereinbefore described.

I desire it to be understood herefrom that the "insertible type" just referred to will not be claimed herein, as the same, together with other features, form the subject-matter of my separate pending application. Serial No. 232,548, filed March 26, 1887, for improvement in type-levers.

K designates a metallic conducting-ring secured upon the base C'' in any suitable manner, having the inclined or flaring sides, as shown, the whole forming substantially an inverted frustum of a cone. Upon the inside and lower edge of said ring is placed a circular strip of insulating material, $l$, (preferably hard rubber,) to which is fastened by screws or rivets the metallic strip $l'$, which, together with the spring-lever fingers $l''$, is formed in one single piece, there being one lever finger carrying a small contact point or stud at its upper end for every type-lever I, the object of which will be hereinafter described.

The cylindrical inclosing-casing A is preferably made of some ornamental wood, having open top and bottom, and formed in two parts, $e$ and $e'$, hinged together on one side and provided with a fastening clip or catch, $d$, and a lug, $b$, on the other side, as shown. This casing is designed to fit in a surface groove or circular recess in the base C'', such construction allowing the said casing A to be removed and replaced when found desirable for any purpose whatsoever—such as repairs or cleaning.

Directly underneath the base C'' is located and secured the ink reservoir or pan L, provided with journaled ribbon pulleys or rollers $m$ $m'$ $m''$.

M''' M'''' indicate, respectively, two rollers or pulleys, journaled at desired points upon short shafts which are fastened on the inside near the top of the casing A. The pulley M''' is provided with a driving-band, $n$, which imparts motion thereto from the shaft of the letter-spacing mechanism.

M is an endless ribbon or band passing over rollers $m$ $m'$ $m''$ M''' M'''' and through perforations $o''$ $o'''$ in the base C'', the roller or pulley $m''$ being journaled centrally and near the bottom of the ink pan or reservoir L.

The flaring ring K is electrically connected with the battery of the spacing-movement by the wire $n'$, and the rim or strip $l'$ is similarly connected with an electro-magnet in circuit with said battery by means of a wire, $n''$. (See equivalent construction in Fig. 8.)

Referring to Fig. 1, the key numbered 2 of the transmitter A' is designed as the spacer (it being supposed that it is the same shown shaded black in the drawings of my separate pending application) for said transmitter. The key 2 is connected with the spacing-magnet $d'''$ by one of the wires $a'$, the magnet $d'''$ being similar in construction to magnets $a''$, except that it is not provided with the link-rod connection or with a type-lever, but on the other hand is electrically connected by wire $o'$ with the circuit of the spacing mechanism, as well as with the battery $D'''$ or $D''''$. The supporting-plate $F'''$, adjustably secured in the slot $d'$ of ring E by screw $f''''$, however, is different in construction to the supports F F, inasmuch as it has only one lug, $p$, for supporting the pivoted armature $d$, which in turn is provided with an extension or arm, $n'''$, carrying a retracting-spring, N, secured at its lower end to such armature. This lug $p$ is also properly electrically connected with the circuit of the spacing mechanism by wire $o$.

O designates the improved circular plug-switch, which is provided with a series of metallic contact-segments, $a''''$ $a''''$, secured on the top of a ring of hard rubber or other insulation, P, by screws $q''$ $q''$, which serve also as binding-posts for the wires $a'''$, connecting said segments with the wires $a'$ near the respective transmitter.

Figure 7:
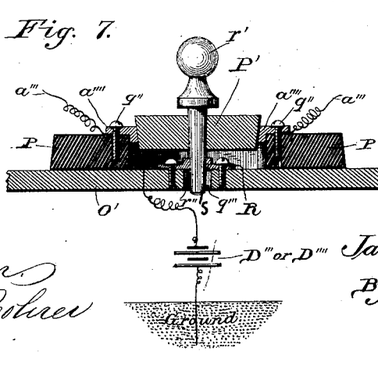
Fig. 7 is a central section through said switch, showing the plug inserted and the arrangement of the electrical connections.

O' indicates a circular plate having central perforation, $q'''$, of larger diameter than the end of the stem of the plug P', and is provided with the centrally-perforated plate R, insulated therefrom and secured by screws upon the top thereof, and surrounded by but not in contact with the ring P, as shown clearly in Fig. 7, the perforation $r''$ of the plate R being of the same diameter as the stem of the plug P and coincident with the perforation $q'''$. The plug P is of the form shown and made of conducting metal, having the handle $r'$. This plug consists of a top circular portion having inclined sides of greater diameter at its top surface than at the bottom, so as to fit and rest in contact with the segments $a''''$ $a''''$ when inserted; and the central spindle or stem, $s$, is designed to fit in the perforation $r''$ and in contact with the plate R, which is electrically connected with the constant battery $D'''$ or $D''''$, as hereinbefore explained.

Q is the paper-roll, under which longitudinally extends the ribbon M. This roll is suitably mounted upon a traveling carriage which is operated automatically forward and backward by means of the spacing mechanism and automatic reversing movement shown in Figs. 8, 9, 9$^a$, 10, 11, 12, 13, and 14. The paper-roll is also actuated automatically to make the necessary line space by the same mechanism just referred to.

The operation of my invention, in conjunction with the transmitting-instruments shown herewith, is as follows: The instruments being in the position shown in Fig. 1, with the button-switches D' D'' properly pointed, the plugs P' of the respective plug-switches O O of instruments A' A'' removed, and the receivers B' B'' respectively in circuit with instruments A' A'', and the operator at the transmitter A' desires to convey a message, (say, for example the words "dynamograph-machine,") over the line B, through instrument A'', into receiver B'', he successively depresses the keys of the instrument A' which carry the letters composing this stipulated message. Now, in order to clearly follow the operation, we will suppose that the first key, corresponding to the letter "D," that is depressed, is identical with the key numbered 1 in Fig. 1. Consequently the depression of said key stops the trailing arm of the instrument A', and will cause thereby the current to be discharged from the battery $D'''$ simultaneously up through wire $g$ into and around ring C, the binding-post $c$, opposite to the respective magnet $a''$, which corresponds to the key numbered 1, along wire $h'$, into said magnet, energizing the same and causing the armature $d$ (see Fig. 2) to be attracted by both poles $f$ $f''''$, which action thereby depresses the forward end of said armature and forces its respective pivoted type-lever I (which is connected thereto as before described) up against the ribbon M, as shown in Fig. 2, making the impression of the type-lever corresponding to the key D upon the paper carried and fed by the paper-roll Q, the flexible link-connection $k$ allowing the lever I a greater curvilinear reciprocation than if the connection were rigid. Now, when the magnet is de-energized by the break of the circuit, (which is caused by the release of the key depressed,) the current will pass to ground and the type-lever will be allowed to fall, the weight of the ball $j'$ being sufficient to retract the respective armature $d$ to its normal position. When the lever I reaches the limit of its descent, this ball $j'$ will strike the spring finger $l''$, effecting a contact of the inwardly-projecting stud of said finger with the ring K, thereby closing the secondary or local circuit, which will, when closed, operate the letter-spacing mechanism herein described at the determinate time and instant after the imprint of the letter is made by the said type-lever. Then the retractibility of the respective spring-finger $l''$, being sufficient to overcome the force of the fall of the lever I and the weight of the ball $j'$, it will return to its normal position, thereby breaking said secondary circuit.

Figure 8:
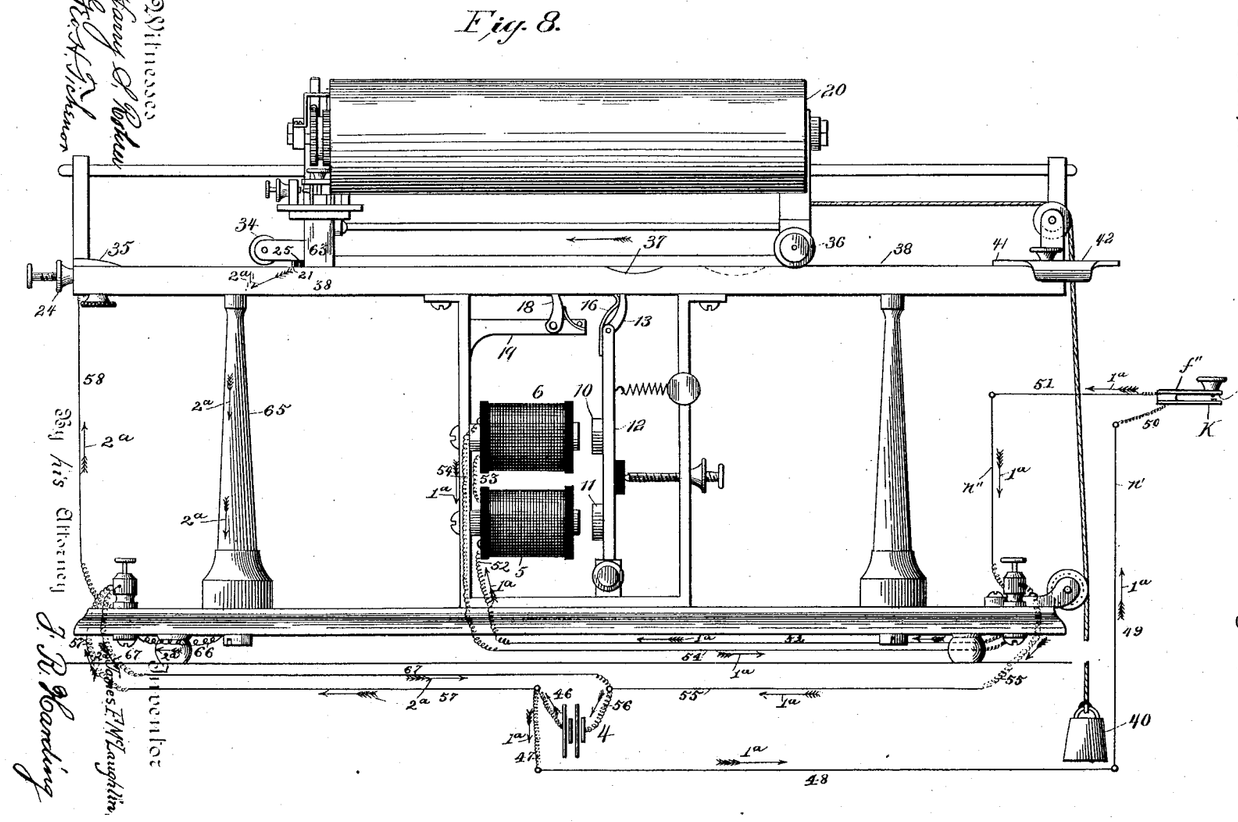
Fig. 8 is a front elevation showing, first, my improved means for advancing the traveling carriage step by step, whereby the letter-spacing is effected at a determinate instant after each imprint is made upon the paper roll carried by said carriage, this apparatus being actuated by each electric pulsation imparted by the fall of each type-lever, which closes a secondary electrical circuit; second, the improvement upon the automatic electro-mechanical line-spacing mechanism shown and described in my pending application, Serial No. 217,338; and, third, the mechanical devices for automatically reversing or returning the traveling carriage to the beginning of the next succeeding line after the desired space has been automatically made between the completed line and the next to be printed.
Figure 10:
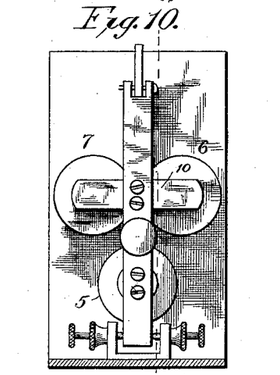
Fig. 10 is a front elevation of the letter-spacing motor, showing the arrangement of the electro-magnets and pivoted armatures.
Figures 11, 12:
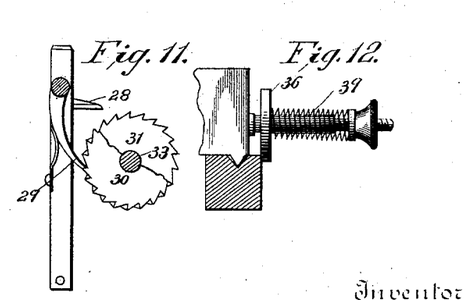
Fig. 11 is a detail elevation of the pawl-and-ratchet mechanism on the end of the paper-roll.
Fig. 12 is a detail view, with parts broken away and partly in section, showing the front cross-bar of traveling carriage, its V-shaped projection, the front guide-rest of the elevated platform, the V-shaped recess therein, and the adjustable spring-actuated reversing-roller journaled upon a short projecting shaft, which in turn is secured at its inner end to the front cross-bar of the traveling carriage.

Referring to Figs. 8 and 10, the circuit-closer 9 is designed to represent the equivalent of the construction shown in Fig. 2, the plate K being electrically connected with battery 4 by wire $n'$ and the spring-plates $f''$ with the binding-posts, which in turn are electrically connected with the electro-magnets 5, 6, and 7, as shown in said Figs. 8 and 10. Now, the secondary circuit being closed from the battery 4 by the descent of a type-lever, or, equivalently, the depression of the plate

Figures 9, 9A, 13, 14:
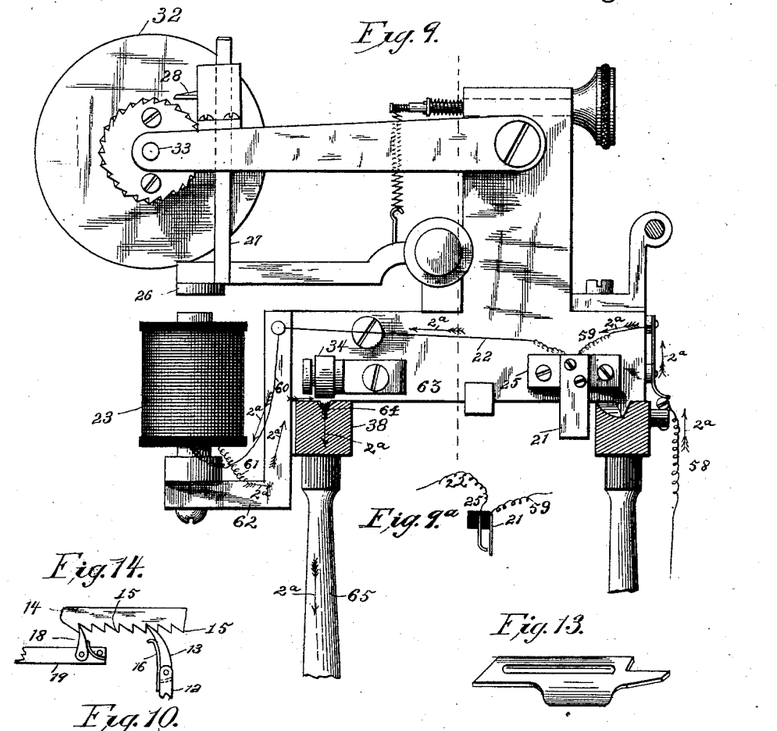
Fig. 9 is a transverse section through the longitudinal guide-rests of the elevated platform of traveling carriage, showing the automatic line-spacing mechanism on the end of said carriage and paper-roll.
Fig. 13 is a detail perspective view of the adjustable roller-plate at the beginning of the line.
Fig. 14 is a detail elevation of the improved pawl-and-ratchet mechanism on the end of the paper-roll.

*f'''*, the current simultaneously effects the energization of the magnets 5, 6, and 7, and causes thereby the attraction of their respective armatures 10 and 11, which are secured opposite to said corresponding magnets upon the pivoted vertical plate 12. The attraction of the armatures 10 and 11 causes the pivoted spring-retracting pawl 13, which is pivotally secured to the upper end of the plate 12, to carry forward the rack-bar 14 of the traveling carriage the distance intervening between any two adjacent teeth 15, as shown in Fig. 14. The pawl will then be retracted from engagement with its respective tooth of the rack-bar by the agency of the spring 16, the shoulder 17 limiting its movement and preventing it from being retracted too far.

Simultaneously with the disengagement of the pawl 13 from any one of the teeth 15 15 the spring safety-pawl 18, which is pivoted to the horizontal arm 19, will engage and hold in one of said teeth, thereby preventing the pawl 13 from advancing the rack-bar more than one letter-space.

The magnets 5, 6, and 7 are de-energized by the agency of any finger *f'''*, which breaks the circuit by virtue of its retractibility overcoming the weight of the ball on the end of the respective type-lever. The circuit is completed back to local battery 4 by the electrical connections. When, as before stated, the circuit is closed by the descent of any type-lever, or, equivalently, the depression of the plate *f'''*, the path of the current will be as follows: From the battery 4 through the wires 46 47 48 49 50, plates *k* and *f'''*, wires 51, *n''*, and 52, magnet 5, thence through wire 53 to magnets 6 and 7, and back through wires 54, 55, and 56 to the battery 4, as shown by the arrows 1ᵃ 1ᵃ. When the traveling carriage arrives at the terminus of a line, (as described subsequently in the operation,) the spring-plate 21 makes contact with the point of the adjustable screw 24, and is thereby impinged against the spring-plate 25, thus closing the circuit at that point. In this instance, since the battery 4 is not being used for the letter-spacing mechanism, the path of the current will then be, as indicated by the arrows 2ᵃ, through wires 46 57 58 59, springs 21 and 25, wires 22 and 60, magnets 23, and back through wire 61, bracket 62, frame 63, V-shaped point 64, the guide rest 38, the standard 65, wire 66, 67, and 56 to the battery 4. Simultaneously with the energization of this particular magnet *a''* and the imprint of a type-lever corresponding to the letter D, as hereinbefore explained, the trailing arm of instrument A'' will be stopped in its revolution, thereby indicating the corresponding key to that depressed at the other end of the line, and the magnet *a''* of the receiver B'', corresponding to keys of both instruments A' and A'', will also be simultaneously energized, thereby effecting the imprint of the particular type-lever corresponding to the type-letter D upon the paper-roll, and the operation of the letter-spacing mechanism in the same manner, as before described, at the other end of the line, the current having instantaneously passed from the magnet *a''* of the receiver B' to ground at the other end of the line, through the particular wire *a'* connecting said magnet with the transmitter A', the auxiliary parts of key No. 1 of the transmitter, the transmitter A', the line B, the corresponding key of instrument A'', the instrument A'', the respective wire *a'* which connects the corresponding key of the instrument A'' with the respective magnet *a''* of the receiver B'', the wire *g*, and the battery D''''. Thus the operation is repeated until the end of the word "dynamograph" is reached. The operator now being desirous of making a space between the word completed (dynamograph) and the next to be written, (machine,) he depresses a spacing key (numbered 2) of the transmitter A', in Fig. 1, thereby causing the current to pass up from the battery D''', simultaneously along wire *g*, into and around the ring C, through wire *h'*, into magnet *d'''*, (shown in Figs. 1 and 2,) energizing the said magnet and causing the attraction of the armature *d*, which closes the secondary circuit through the wires *o o'* and operates the spacing mechanism, as before described, without effecting an impression of a type-lever upon the paper. Thus it will be readily understood that the operator transmits the desired message over the line and at the same time records the said message through the agency of receivers B' B'' at the respective extremities of said line.

When the traveling carriage 20 reaches the end of the line, the spring-plate 21, which is electrically connected through wire 22 with the magnet 23, it will impinge against the end of the adjustable screw 24, (shown in Fig. 8,) which action will cause the contact of said spring-plate with the plate 25, which is in circuit with the battery 4, (see Figs. 8, 9, and 9ᵃ,) thereby closing the circuit and causing the energization of the magnet 23, and consequently the attraction of its armature 26 and the depression of the standard 27, which carries the pawls 28 and 29. Such action will cause the spring-pawl 29 to rotate the ratchet-wheel 30 the distance or line-space between any two adjacent teeth thereof, and at the same time the pawl 28 will engage in one of the teeth of the ratchet-wheel 31 and prevent the pawl 29 from rotating the paper-roll 32 more than one line space, both ratchet-wheels 30 and 31 being rigidly keyed on the short shaft 33. After the line-space has been effected in the manner just described, the roller 34 will ride up on the beveled surface of the adjustable plate 35, thereby placing the traveling carriage upon an inclined plane, and at the same time the roller 34 advances upon the plate 35 the roller 36 (see Fig. 12) will be coincident with the arc-shaped recess 37 of the guide-rest 38, and the spring 39 will force said roller into recess 37, thus lifting the rack-bar of the traveling carriage out of engagement with and above the pawls 13 and 18. Now, the carriage being upon an inclined plane and the roller 36 within the recess 37, the weight 40 will overcome the weight of the traveling carriage and return it (the carriage) to the beginning of the next line to be printed, the roller 36 running on top of the guide-rest 38 during the recoil of the carriage. When the said roller 36 reaches the point or projection 41 of plate 42, it will be guided along the inclined edge or side of said projection, and will be thereby automatically returned to a position ready for the next line to be printed. Thus it will be obvious that by the change of the roller from the surface of the guide-rest to the side thereof, the pawls 13 and 18 will again come into engagement with the rack-bar, and, furthermore, it will be apparent that the weight 40 must be of just a sufficient size to overcome the weight of the traveling carriage and give it the desired momentum to recoil without jar or injury. Again, it will be also understood that the battery 4 can be utilized for both the line and letter spacing mechanisms, since they are not both in operation at the same time. Should it now be necessary to transmit from the instrument A″ to A′, the adjustment of the parts of the transmitters and the points of the button-switches is simply reversed.

When desirable to cut either or both of the receivers out of circuit with their respective transmitters, the operator inserts the plugs P′ in the plug-switches O O, making contact with the segments $a''''$ $a''''$ and plate R, thereby opening a shorter path for the current from the battery D‴ or D″″ than through the receiver B′ or B″. Thus, when a key of the transmitter A′ is depressed, the current, instead of passing through the receiver B′, is discharged up through the wire $g'$, the switch O, plug P′, wire $a'$, into the transmitter A′, then over the line D into the transmitting-instrument A″, and then, if the plug P′ of its respective switch is inserted, the current will pass therethrough down to battery D″″ or to ground without actuating the receiver B″. Each fall of a type-lever will advance the endless ribbon M intermittently, thereby giving a fresh inking-surface for each and every stroke of said type-levers, inasmuch as a part of said ribbon is continually guided through the ink contained in the reservoir L by the roller $m''$.

The object of the roller $m$ and its tension-spring $v$ is to prevent the ribbon from becoming oversaturated with the ink after it leaves the reservoir, so as to obviate undesirable dripping.

All of the levers I I are of exactly the same length and are so arranged in the circular slot $i$ of the ring G that they will, when forced against the ribbon M, strike at a central point, as shown in Fig. 2.

Having thus fully described the construction and operation of my invention, I will now proceed to explain the combination and arrangement of the parts of same when used as an electro-mechanical type-writer.

In Fig. 3 is shown the arrangement of the mechanical key-board S, which consists of a series of parallel levers, $t\ t$, pivoted at their forward ends to a shaft, $t'$, which is journaled at each end in a bearing-lug, $t''$.

U U are the finger-keys carrying the letters, &c., and are attached to the radiating curved outward ends of said levers, as shown.

V designates a flexible link-connection similar in construction to the connection between the armatures $d\ d$ and the type-levers I I, and is attached at its upper end to the under side of the forward extremity of each armature $d$, and at its lower end is connected to its respective lever $t$, the base C″ being provided with a series of perforations, $w\ w$, arranged in a perpendicular line with each end of the armatures and adapted to allow the connections V to pass therethrough. The armatures $d\ d$ correspond in number and identity with their respective keys U U, located, as before stated, on the outer ends of the levers $t\ t$.

The object of arranging the key-board S in the manner shown is for the sake of convenience to the operator, affording a systematic arrangement of the keys in two arc-shaped rows, whereby they are rendered more conspicuous and at the same time are within easy reach and manipulation. In accordance with such arrangement it will be obvious that the levers $t\ t$ must be of different lengths, the shorter ones terminating in keys on the inner row and the longer on the outer row.

W and W′ designate two arc-shaped cushion-stops, secured, respectively, underneath and parallel to the key-rows and each provided on their upper edges with a rubber strip or other elastic material, the stop W′ being of less height than the stop W, for a reason which will be hereinafter explained.

The operation of my invention, in conjunction with the mechanical key-board S, is as follows: The operator desiring to use the machine locally and mechanically, he depresses successively the respective keys U U, carrying the letters, &c., composing the matter to be written. The depression of the first key will depress the curved outer end of its respective lever $t$, thereby causing the link-connection V to pull downwardly upon the forward end of its armature $d$, which will effect the imprint of the respective type-lever I against the paper roll in a similar manner as when operated electrically, as before explained. Thus the operation is repeated indefinitely.

Figure 4:
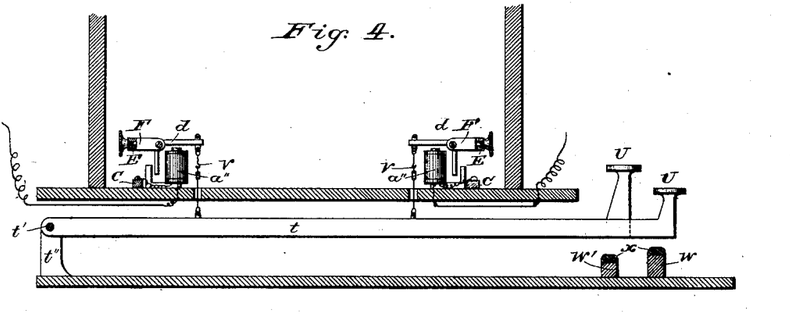
Fig. 4 is a longitudinal sectional view showing the manner of attaching each lever of the mechanical key-board with a pivoted armature which operates its respective type lever.
Figure 5:
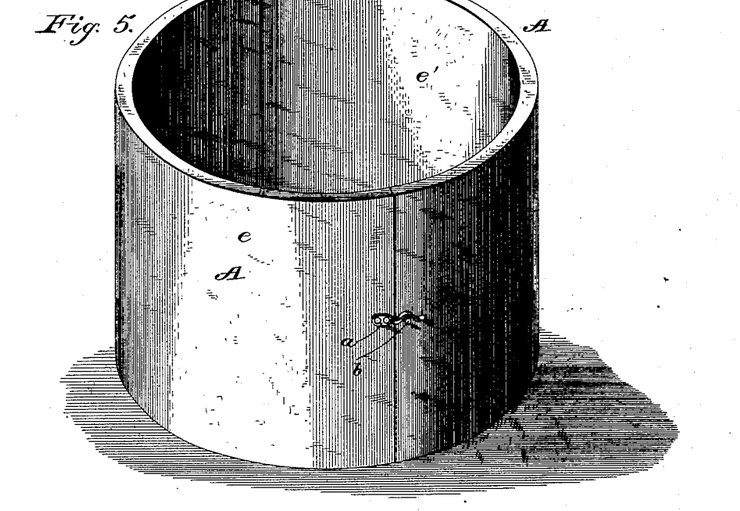
Fig. 5 is a detail perspective view of the hinged cylindrical inclosing-casing.
Figure 6:
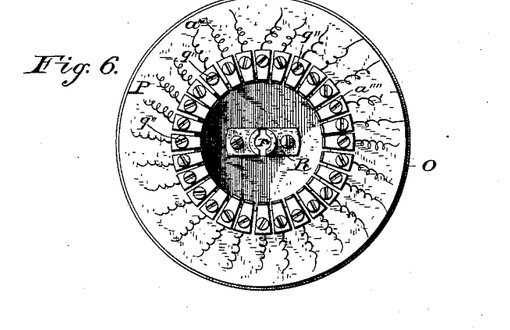
Fig. 6 is a top plan view of the plug-switch or cut-out.

We will suppose, for example, that the first key depressed of the mechanical key-board is situated in the inner arc-row, and consequently is attached to one of the shorter levers. Then it will be apparent that such lever, being shorter, would have to be depressed a greater distance than if it terminated in the outer row. Therefore it will again be obvious that the distance from the stop W' is greater to the short levers than from W to the outer key-row, and, furthermore, that the inner key-row will be on a higher plane than the outer key-row, as shown in section in Fig. 4.

Having thus fully described my invention, what I claim as new, and desire to secure by Letters Patent of the United States, is—

1. An electro-mechanical receiver comprising a series of fulcrumed type-levers carrying, respectively, the desired types or symbols, electro-magnets for actuating said levers, a local circuit including spacing mechanism, and a suitable circuit-changer in said circuit operated by each of said type-levers, all arranged to operate as specified.

2. In a receiver for printing-telegraphs for automatically receiving and printing messages, the combination of a suitable transmitter having circuit-closing keys electrically connected with a corresponding electro-magnet of the receiver, provided with a pivoted armature located in proximity to the poles thereof and connected by flexible link-rods to each and every type-lever, a series of fulcrumed type-levers radially and adjustably arranged, as shown, around a central point, and the means, such as described, which automatically operates a local electrical circuit by descent of any of said type-levers after the imprint of desired letter is made upon a traveling paper roll, as set forth.

3. In a receiver for printing-telegraphs, in connection with a suitable transmitter provided with a series of circuit-closing keys electrically connected respectively with each corresponding electro-magnet of receiver, the combination of a series of electro-magnets having each a pivoted armature flexibly connected with upper end of a type-lever by link-rods, a series of fulcrumed type-levers radially and adjustably arranged around a central point and adapted to be forced up against paper roll by the attraction of its respective armature, the means for automatically operating a local circuit by descent of said type-levers after their imprint or registration is effected, and the electro-mechanical means, such as described, for operating a local circuit without effecting an impression of a type-lever upon traveling paper roll, as described.

4. The combination of a series of adjustably-fulcrumed type-levers flexibly connected at their upper ends by link-rods with a correspondingly-pivoted armature, an electro-magnet operating said armature, whereby said type-levers are forced upwardly by the closing of an electrical circuit, a local circuit, and a circuit-changer included in said circuit and operated by the type-levers, as shown and described.

5. The combination of the electro-mechanical means for effecting the imprint of symbols, comprising a series of fulcrumed type-levers, electro-magnets for severally actuating said levers, a local electrical circuit, and circuit-changer therein operated by any of said type-levers, with means, as shown, for gradually advancing and inking an endless ribbon, by which the type-levers record their imprint upon the paper, and a traveling paper roll for automatically feeding said paper, substantially as described.

6. The combination of a series of fulcrumed type-levers radially supported around a central point, with electro-mechanical means for actuating said type-levers, and an automatic device for operating a local electrical circuit by the descent of any one of said levers, as specified.

7. The combination of a suitable transmitter for printing-telegraphs, having a series of circuit closing keys electrically connected with a series of corresponding electro-magnets circularly arranged in a receiver, with said magnets each having a pivoted armature adapted to be attracted by both poles of its respective magnets, and the conducting circuit-ring electrically connected with a suitable battery and with each magnet, substantially as described.

8. The combination of a suitable transmitter for printing-telegraphs, having a series of circuit-closing keys each electrically connected with a respective electro-magnet in a receiver, with the receiver, such as described, for automatically printing each letter indicated by the depression of key of transmitter upon a traveling paper roll by the upward stroke of one of a series of fulcrumed type-levers actuated by the closing of a circuit by said key of transmitter, and at a determinate instant thereafter operating a local electrical circuit by the descent of the same type-lever which made the imprint upon the said paper roll.

9. In a combined transmitter and receiver for an electrical type-writer, a transmitting-instrument having a series of circuit-closing keys, each electrically connected to one of a series of corresponding electro-magnets in a receiver, the receiver comprising a series of fulcrumed type-levers, and electro-magnets provided with armatures for actuating said type-levers, in combination with a local electrical circuit, including a circuit-changer, spacing mechanism in said circuit, and means such as shown and described for cutting the receiver out of circuit with its respective transmitter, as shown and described.

10. The combination of the receiver for an electrical type-writer with the shunt-plug switch having a removable plug for making a dual electrical contact both with the series of switch-segments and the perforated circular battery-plate, cutting said receiver in or out of circuit with its respective transmitter, and for shunting the transmitter in the circuit, the electrical connections, and the circuit, as set forth.

11. In an electrical type-writer, the combination of a series of electro-magnets, each having a lower extended pole-piece and circularly arranged, as shown, a series of armatures corresponding in number and relative situation with the said magnets and acted upon severally by both poles of their respective magnet, a series of type-levers actuated by said armatures, a circuit-ring electrically connected with each magnet, the circuit, the electrical connections, and the transmitter, as specified.

12. The combination of a series of electro-magnets, each having a lower extended pole-piece, the circuit-ring electrically connected, respectively, with the electro-magnets, the electrical connections, the transmitter, the pivoted armatures acted upon by both pole-pieces of each magnet, and the adjustable supports for said armatures, as set forth.

13. The combination of the transmitter having each key thereof electrically connected to its corresponding magnet, the electro-magnets arranged as shown, the circuit, the parallel ring having a binding-post for each magnet, the pivoted armatures, the adjustable supports therefor, and the slotted ring carrying said supports, substantially as described.

14. The combination of the series of circularly-arranged electro-magnets connected electrically with their respective keys of transmitter and each having a lower extended pole-piece, the pivoted armatures, the adjustable supports, the fulcrumed type-levers, and the connections between each armature and type-lever, substantially as described.

15. The combination of electro-magnets arranged as shown and having their lower poles converted and brought up in proximity to lower arm of pivoted armature, the pivoted elbow-shaped armatures, the adjustable supports and slotted ring therefor, the link-rods and links connecting the forward end of each armature with upper end of its respective type-lever, the fulcrumed type-levers, and their supporting-ring provided with transverse central slot, as described.

16. The combination of the ring carrying the adjustable type-lever supports and having a central transverse slot, the adjustable type-lever supports, and the type-levers, whereby the said levers may be adjusted at any desired intervals apart and in an inclined position, as shown.

17. The combination of levers I I with ring K, strip l', fingers l'', and the electrical wires connecting, respectively, ring K and strip l' with secondary circuit.

18. The means, such as shown, for cutting the receiver out of circuit with its respective transmitter, which consists of a plug-switch having a series of segments corresponding in number both to keys of transmitter and magnets of receiver, which are each electrically connected to their respective keys of transmitter, a metal plate in circuit with battery of receiver, and a removable conducting-plug of suitable shape to simultaneously make contact with segments and battery-plate when inserted, substantially as described.

19. The means, such as shown, for cutting the receiver out of circuit with its respective transmitter, which consists of a plug-switch having a series of segments corresponding in number to the keys of a transmitter, which are each electrically connected to their respective keys of the transmitter, a metal plate in circuit with a battery of a receiver, and removable conducting-plug of suitable shape to simultaneously make contact with segments and battery-plate when inserted, substantially as described.

20. The combination of the transmitter and the receiver with the plug-switch, consisting of a series of segments corresponding in number to keys of transmitter and connected by wires $a'''$ and $a'$ to said keys, the insulating-ring P, plug P', and plates R and O', and the battery of receiver electrically in circuit with plate R, as described.

21. The combination of the curved parallel levers $t\ t$, keys U U, arranged as shown, the cushion-stops W and W', shaft $t'$, bearings $t''$, connections V V, armatures $d\ d$, and the base C'', having perforations $w\ w$, as described.

22. An electro-mechanical type-writer, comprising a series of fulcrumed type-levers carrying, respectively, the desired types or symbols, electro-magnets for actuating said levers, circuit-closing mechanism for directing the current through a particular magnet, the main circuit, a local circuit, including spacing mechanism, and a suitable circuit-changer in said local circuit, operated separately by each of said type-levers, all arranged to operate as specified.

23. In an electrical type-writer, a series of fulcrumed type-levers, electro-mechanical means for actuating said type-levers, a traveling carriage, a local circuit, an electro magnetic motor in said circuit for advancing the carriage step by step, and a circuit-changer, also included in the local circuit, operated by the type-levers, substantially as described.

24. In an electrical type-writer, circuit-closing mechanism for directing the current severally through a series of magnets, a magnet provided with a circuit-changing armature, a circuit operated by said armature, electro-magnetic spacing mechanism in said circuit, and a traveling carriage, all arranged to operate as set forth.

In testimony whereof I affix my signature in presence of two witnesses.

JAMES F. McLAUGHLIN.

Witnesses:
 THOS. J. HUNT,
 FRANK M. MILLER.